9551X
No Printed Specification Available
C. S. Mercer,
Water Wheel.
Patented Mar. 30, 1836.
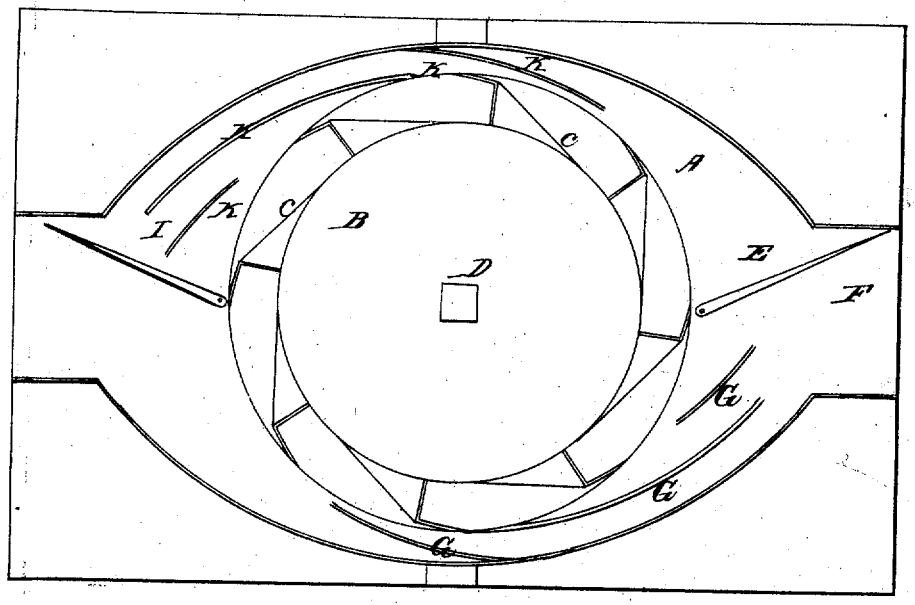
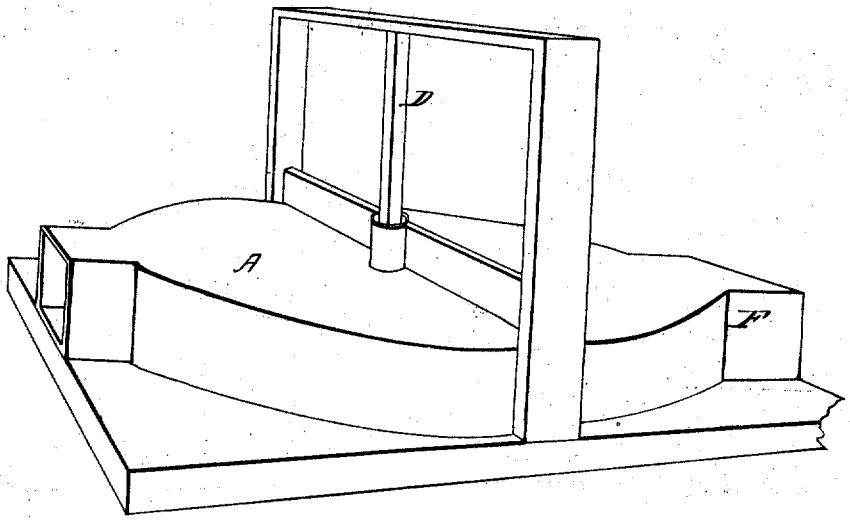
N. PETERS, PHOTO-LITHOGRAPHER, WASHINGTON, D. C.

3/30/1836 9551X ur 10

Mar. 30. 1836 13

Carey A. S. Mercer
[illegible]

The Schedule referred to in these Letters Patent
and making part of the same containing a de-
scription in the words of the said C. S. Mercer him-
self of his improvement in the Tide Water Wheel.

Be it known that A. Carey S. Mercer of [illegible]
[illegible] in the County of Baltimore and State of Maryland
have invented a new and useful improvement in the
Tide Water Wheel which is described as follows, re-
ference being had to the annexed drawings of the same
making part of this specification.
A. represents the dam [illegible] in which the water
Wheel works in a [illegible] position. B the water
wheel. C the buckets of the water wheel. D the verti-
cal shaft on which is a [illegible] wheel for convey-
ing the power to any machinery [illegible] the mill
or elsewhere. E gate for directing the flood tide
to the buckets, turning [illegible] on a hinge and
operated by cords and pulleys [illegible]
F flume. G curved guides for directing the water
to several buckets at [illegible] H another gate
for directing the ebb tide to the buckets of the water
wheel in the direction of I. the [illegible] of the gate
being fixed [illegible] to the opposite side of the flume
in the manner described for the gate E.
K guides for directing the ebb tide against the buckets
of the water wheel [illegible] flood tide but
on the opposite side. This Wheel is to be
placed in a creek, or other place, near the mill
where the tide will only flow, and must be set be-
low [illegible] tide in a situation where the [illegible] has com- 3/30/1836 9551x to extend itself over a large surface by which means
the water in [illegible] the [illegible] the flume at the mill
during the ebbing of the tide will produce a strong
current. The entrance of the water into the Creek
from the river is to be regulated by a strong flood
gate in such manner that during flood tide and
when it is required to obtain a stronger current out
in the flume the flood gate shall be but partly raised
which will produce a difference in the levels of the
water in the river and in the Creek, thus causing
a stronger current in the flume. At high water
the gate is entirely opened. When the tide begins to
ebb the same operation is performed as during the
flood tide —— What I claim as my invention
and which I wish to secure by Letters Patent
consists in the [illegible] given as before recorded ——

Witnesses
H. B. James Cooke C. H. [illegible]
[illegible] M. Beck (480 [illegible])

(Received & Recorded, April 23d 1837.)

[illegible]

Drawing